United States Patent Office 3,401,154
Patented Sept. 10, 1968

3,401,154
COPOLYMERS OF ROSIN CONTAINING MONOMERS AND VINYL MONOMERS
Norman C. MacArthur, Avondale, Pa., assignor to Hercules Incorporated, a corporation of Delaware
No Drawing. Filed May 6, 1964, Ser. No. 365,511
16 Claims. (Cl. 260—78.5)

ABSTRACT OF THE DISCLOSURE

High molecular weight and stable rosin rich copolymers and terpolymers are provided by the polymerization of the reaction product of rosin acid partial esters of a polyol and an $\alpha,\beta$-unsaturated dicarboxylic acid or anhydride with at least one polymerizable monomer containing a vinyl group.

This invention relates to rosin containing copolymers and terpolymers based on the free radical initiated copolymerization of unsaturated esters of rosin with other polymerizable monomers. More particularly, it relates to novel and improved rosin containing copolymers and terpolymers based on components comprising a polyol, a rosin acid, an $\alpha,\beta$-unsaturated acid or anhydride and at least one polymerizable monomer having a $>C=CH_2$ group.

The above ingredients have been combined in various ways to form resinous products. Thus, it is known that polyfunctional acids and alcohols react at high temperatures to produce polyesters, commonly known as alkyds, and that these can be subjected to vinylation, e.g., a process carried out at high temperatures and with large amounts of initiator whereby vinyl polymer chains are caused to graft themselves to certain kinds of alkyds, i.e., oil-modified alkyds. It is also known that rosin-modified alkyds can be prepared with rosin acids or alcohols and/or the rosin acid partial-polyol esters.

A principal object of the invention is the provision of a novel class of copolymers and/or terpolymers, rich in rosin, capable of being prepared with wide variations in properties such as hardness, toughness and solubility and which have requisite functionality for curing with reactive resins.

Another object of the invention is the provision of a novel process for preparing the indicated types of copolymers and/or terpolymers.

It has now been found that novel and highly useful copolymers and/or terpolymers can be formed by the conjoint polymerization of (1) an ester mixture derived by reaction of at least one $\alpha,\beta$-unsaturated dicarboxylic acid or anhydride with a mixture of rosin acid partial esters of a polyol, said ester mixture having the average formula

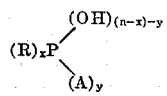

where P is the residue of a polyol of hydroxyl functionality $n$ esterified with $x$ equivalents of rosin acid R and $y$ equivalents of an $\alpha,\beta$-unsaturated dicarboxylic acid or anhydride A, $n$ being at least 2, $x$ being at least 0.5 and not greater than $(n-0.5)$, $y$ being at least 0.5 and not greater than 2.0, and $(n-x)-y$ ranging from about 0 to about 2.5 with (2) from about 10% to about 90% by weight, based on the weight of (1) plus (2) of at least one polymerizable monomer having a $>C=CH_2$ group. The terms "equivalents of rosin acids" and "equivalents of unsaturated dicarboxylic acid," as used herein, are based on the hydroxyl functionality of the polyol, one equivalent being that amount of rosin acid or dicarboxylic acid which when reacted with the polyol will reduce its hydroxyl functionality by one.

These products are not the rosin-modified alkyds or vinylated derivatives thereof of the prior art but stable, high molecular weight copolymers and/or terpolymers prepared by copolymerizing monomeric constituents at least one of which is a special kind of rosin-$\alpha,\beta$-unsaturated dicarboxylic acid ester of a polyol. These copolymers are characterized by a surprisingly large content of rosin or rosin acid and by a functionality which makes them useful for post-curing uses. Moreover, the large rosin content and functionality are obtained by procedures which those skilled in the art have thought resulted in gelled, i.e., intractable products. And, finally, these new copolymers permit the design of resins with wide variations in hardness, toughness, compatibility and solubility and provide a means by which the properties of rosin can be contributed to formulations ranging all the way from aliphatic hydrocarbon solubility to alcohol solubility. In the interest of simplicity, the term "copolymers" will be used herein to designate polymers formed by the conjoint polymerization of two or more monomeric constituents.

Having described the invention generally, the following examples are given to illustrate specific embodiments thereof. The partially hydrogenated rosin utilized in the examples was a commercial hydrogenated rosin characterized by a softening point of 75° C. (Hercules Drop Method), an acid number of 165, a saponification number of 167, unsaponifiables of 9.3%, gasoline insolubles nil, a specific rotation of +27° and a refractive index at 100° C. of 1.5008. The pentaerythritol used in the examples was a technical grade of pentaerythritol characterized by containing about 86–90% monopentaerythritol, about 47–49% hydroxyl, less than 0.01% ash content (as $Na_2SO_4$), a minimum of 99.5% solids, and by having a combining value of 35.4 for each hydroxy equivalent.

Example 1

Six hundred and eighty grams (approximately two equivalents) of the partially hydrogenated rosin described above was heated to 200° C. under a blanket of nitrogen. To the heated rosin there then were added 2.0 grams of lithium hydroxide and 141.6 grams of the technical grade pentaerythritol described above. The reaction mixture was then heated to 290° C. and held to an acid number of 15 (135 minutes). The melt was cooled to 200° C. and poured into pans where it solidified on cooling to room temperature. The amber-colored product had a softening point of 89° C. (Hercules Drop Method) and an acid number of 13.

Seven hundred and eighty-seven grams of the rosin—pentaerythritol esters, prepared as above described, were heated to 160° C. under a blanket of nitrogen and 49 grams (1 equivalent) of maleic anhydride added. The temperature was held at 160° C. for 15 minutes, the melt cooled to 140° C. and then poured into pans where it further cooled and solidified. The final product softened at 105° C. and had an acid number of 42. A 70% solids (nonvolatiles) solution of the product in xylene had a Gardner-Holdt viscosity at 25° C. of T–U and a color (estimated) of 11–12.

Three hundred and fifty-eight grams of the above 70% solids solution containing 250 grams of solids (nonvolatiles) was heated to 135° C. with stirring under a blanket of nitrogen. To the heated solution was added dropwise over a 2-hour period a solution of 7.2 grams of dicumyl peroxide in 107 grams of styrene. After completion of the addition, the temperature was held at 135° C. for another hour. The final solution contained 77% solids. The acid number of the solid resin product was 26 and the softening point 112° C.

The resin was soluble in aromatic and aliphatic hydrocarbon solvents. It was compatible with ethyl cellulose, ethyl hydroxyethyl cellulose, low-molecular weight acrylic resin, and amino resins.

A 50% solution of this resin in xylene was blended with a melamine-formaldehyde resin and a urea-formaldehyde resin at 50/50, 70/30 and 90/10 resin:amino resin ratio. These blends were drawn-down on glass slides and baked for 30 minutes at 300° F. Upon cooling, the coated slides were immersed in xylene for 30 minutes to determine the degree of cure. The films wrinkled and softened but did not dissolve, indicating cross-linking of the copolymer resin with the amine resins. By comparison, a control rosin ester (a glycerin ester of polymerized rosin) was blended with the urea-formaldehyde resin and baked 30 minutes at 300° F. After 30 minutes immersion in xylene, the film had completely dissolved, indicating that cross linking did not occur.

Example 2

In this and the remaining examples, the general procedure set forth in Example 1 was followed, with some changes in reaction conditions and/or reactants and amounts thereof being used. In this example, a rosin—pentaerythritol—maleic anhydride monomer product was prepared similarly to Example 1 except that 98 grams (2 equivalents) of maleic anhydride was used. The final monomer product softened at 112° C. and had an acid number of 67. A 60% solids (nonvolatiles) solution of the product in xylene had a Gardner-Holdt viscosity at 25° C. of C and a color of 11.

Six hundred and sixty-seven grams (400 grams of nonvolatiles) of this 60% solids solution of rosin—pentaerythritol—maleic anhydride monomer was heated to 135° C. with stirring under a nitrogen blanket and at this temperature a solution of 11.4 grams of dicumyl peroxide in 172 grams of butyl acrylate was added dropwise. The addition required an hour. Temperature was then maintained at 135° C. for five hours. The cooled polymer solution had the following properties:

| | |
|---|---|
| Percent solids | 66 |
| Viscosity (Gardner-Holdt at 25° C.) | V–W |
| Viscosity (percent solids reduced to 60% in xylene—Gardner-Holdt at 25° C.) | H |
| Acid number (solid) | 44 |
| Softening point °C | 110 |
| Rosin ester—maleate:acrylate by wt | 70:30 |

This resin was compatible with ½ sec. RS nitrocellulose, N–22 ethyl cellulose, Parlon (chlorinated rubber), poly-(vinyl chloride), and ethyl hydroxyethyl cellulose.

Example 3

This example was carried out similarly to Example 2 except that methyl methacrylate was substituted for butyl acrylate, the period of addition covered 6 hours and temperature and stirring were maintained for an additional hour. The cooled polymer solution had the following properties:

| | |
|---|---|
| Percent solids | 66 |
| Viscosity (Gardner-Holdt at 25° C.) | $Z_5$ |
| Viscosity (percent solids reduced to 60% in xylene—Gardner-Holdt at 25° C.) | $Z_1$ |
| Acid number (solid) | 43 |
| Softening point °C | 132 |
| Rosin ester—maleate:methacrylate by wt | 70:30 |

This resin was compatible with ½ sec. RS nitrocellulose, low-molecular weight acrylic resin and Parlon (chlorinated rubber).

Example 4

This example was carried out similarly to Example 2 except that butyl methacrylate was substituted for butyl acrylate, the period of addition covered one hour, and temperature and stirring were maintained for an additional four hours. The cooled polymer solution had the following properties:

| | |
|---|---|
| Percent solids | 63 |
| Viscosity (Gardner-Holdt at 25° C.) | Z |
| Viscosity (percent solids reduced to 60% in xylene—Gardner-Holdt at 25° C.) | L |
| Acid number (solid) | 47 |
| Softening point °C | 126 |
| Rosin ester—maleate:methacrylate by wt | 70:30 |

This resin was compatible with ½ sec. RS nitrocellulose and low-molecular weight acrylic resin.

Example 5

This example was carried out similarly to Example 4 except that a solution of 10.5 grams of dicumyl peroxide in 157 grams of butyl methacrylate was added over a period of one hour and 20 minutes.

The cooled polymer solution had the following properties:

| | |
|---|---|
| Percent solids | 70 |
| Viscosity (Gardner-Holdt at 25° C.) | $Z_4$ |
| Viscosity (percent solids reduced to 60% in xylene—Gardner-Holdt at 25° C.) | $Z_1$ |
| Acid number (solid) | 38 |
| Softening point °C | 110 |
| Rosin ester—maleate:methacrylate by wt | 60:40 |

This resin was compatible with ½ sec. RS nitrocellulose and low-molecular weight acrylic resin.

Example 6

A mixture of rosin esters of pentaerythritol was prepared with an acid number of 15 as per Example 1. After reaching this acid number at 290° C., the melt was cooled to 160° C. and 222.0 grams (1.5 equivalents) of phthalic anhydride and 49.0 grams (1 equivalent) of maelic anhydride added. Temperature was held at 160° C. for 20 minutes and then the clear melt was poured into trays where it solidified. The final product had a solid acid number of 107 and a softening point of 93° C.

One thousand grams of a solution (A) of 700 grams of this rosin ester mixture and 300 grams of xylene were heated to 135° C. under a nitrogen blanket at which point dropwise addition of a solution (B) containing 153 grams of styrene, 146 grams of maleic anhydride, 20 grams of dicumyl peroxide and 47 grams of acetone was started. The addition required 2 hours. The acetone (used to keep the maleic anhydride in solution) was removed via a $H_2O$ trap in series with the flask and the condenser. After the addition was complete, stirring was continued for one hour, still at 135° C. The viscous, hazy solution was reduced to 50% nonvolatiles with methyl isobutyl ketone.

Five hundred grams of this solution were mixed with 100 grams of butanol and held for 3 hours at 120–125° C. This solution was then reduced with methyl isobutyl ketone and precipitated in 10 volumes of hexane to recover the alcohol-soluble resin.

Example 7

This example was carried out similarly to Example 6 except that solution (A) contained 300 grams of the rosin ester mixture and 215 grams of xylene and solution (B) contained 150 grams of styrene, 150 grams of maleic anhydride, 20 grams of dicumyl peroxide and 40 grams of acetone. Addition took 2½ hours. Acetone was distilled off during the addition.

Over the next hour, 200 grams of butanol was added which lowered the reflux temperature to ca. 125° C. The mixture was maintained for 2 hours at this temperature and the solution was cooled.

The polymer was recovered by precipitation from 10 volumes of hexane. The polymer had an acid number of 180. It was soluble at 50% in 2B alcohol and at 20% in aqueous ammonia using 20% excess NH₃ based on the acidity of the resin. Viscosity of the 50% alcohol solution was Q. Color was 5. Viscosity of the 20% ammonia solution was F and color was 4.

Example 8

A mixture of rosin esters of pentaerythritol was prepared as in Example 1 except that the hold time at 290° C. was reduced to 70 minutes, producing an acid number of 25–30. The product had an 85° C. softening point (estimated) and a final acid number of 20. After reaching this acid number at 290° C., the melt was cooled to 160° C. and then reacted with phthalic anhydride and maleic anhydride utilizing the procedures and amounts of reactants utilized in Example 6. The final product had a solid acid number of 114 and a softening point (estimated) of 90° C.

One hundred and eighty-eight grams of an 80% solution of this monomer mixture in butyl alcohol [solution (A)] and 0.3 gram of benzoyl peroxide were heated to 80° C. under a nitrogen blanket and a solution (B) containing 90 grams of styrene, 60 grams of maleic anhydride, 16 grams of acetone and 1.2 grams of benzoyl peroxide added dropwise over a 2-hour period. During the addition of solution (B), 50 grams of butanol were added at about the same rate. With the complete addition of solution (B), the reaction mixture was taken to 125° C. for 1.5 hours and then cooled.

The polymer was recovered by precipitation from 10 volumes of hexane. The recovery of polymer was 96%. The solid acid number was 191. The resin was soluble at 50% in 2BA alcohol. Viscosity of the 50% solution was $Z_2$.

The examples illustrate the wide range of properties it is possible to incorporate in the rosin containing copolymers of the invention. The copolymers and the process of preparing them are more specifically described below.

The preparation of the novel copolymers of the invention is best described in three parts, namely, (1) preparation of the mixtures of rosin acid partial esters of the polyol, (2) preparation of the ester mixture by reacting the product prepared in step (1) with an α,β-unsaturated dicarboxylic acid or anhydride, and (3) copolymerization of the ester mixture (2) with at least one polymerizable monomer containing a >C=CH₂ group. This will be followed by a brief description of some "post reactions" of these copolymers with various reactive resins.

The preparation of the mixture of rosin acid partial esters of a polyol involves heating at a temperature from about 190° C. to about 250° C. a polyol having a hydroxyl functionality of at least two (2) with a rosin acid. This reaction, as well as subsequent reactions used in preparing the copolymers of the invention, is preferably carried out under an inert atmosphere supplied, for example, by nitrogen or carbon dioxide. This esterification reaction can be carried out by either the wellknown fusion or solvent techniques. In general, the esterification reaction is carried out so that the acid number falls to about 15 or below, especially in cases where the solubilities and compatibilities common to rosin esters are desired. However, when alcohol-soluble products are desired, it is well to stop the esterification at higher values, e.g., at an acid number from about 25–30.

The equivalents of rosin acid used will vary depending on the hydroxyl functionality of the polyol, the properties desired in the final product and so on. While some improvement can be obtained utilizing as little as 0.5 equivalent of rosin acid, it is preferred to utilize at least about one equivalent of rosin acid. The maximum amount of rosin acid to be used is that which will leave sufficient hydroxyl functionality in the polyol to form the half-ester of the α,β-unsaturated dicarboxylic acid and to provide the hydroxyl functionality desired in the final product.

In general, it is preferred that the hydroxyl functionality at this point be at least one (1), although there are cases where useful products were obtained when the hydroxyl functionality was only 0.5. Therefore, the equivalents of rosin acid should not exceed the value ($n-0.5$) and preferably the value ($n-1$) where $n$ represents the hydroxyl functionality of the polyol.

As indicated above, any polyol having a hydroxyl functionality of at least 2, e.g., ethylene glycol, propylene glycol, butylene glycol, butane diol, butene diol, and so on, can be used herein. However, the advantages of the invention are more fully realized with the more functional polyols such as glycerol, trimethylolethane, trimethylolpropane, pentaerythritol, dipentaerythritol, and the like, and hence polyols having a hydroxyl functionality of three or more are preferred. Mixtures of various polyols can also be used as long as the average hydroxyl functionality of the mixture is at least two (2) and preferably at least three (3) or more.

The rosin acid component of these products can be abietic acid in its pure form or as obtained from gum or wood rosin and its dehydrogenated and hydrogenated, including substantially completely hydrogenated, derivatives. It can also be wood rosin, gum, rosin, or tall oil rosin, in crude or refined form, or a dehydrogenated or partially or substantially completely hydrogenated wood rosin, gum rosin or tall oil rosin. In most cases, a partially or substantially completely hydrogenated rosin or rosin acid is preferred in order to eliminate or at least, substantially reduce, the possibility of a competing Diels-Alder reaction during reaction of the rosin acid partial ester of the polyol with α,β-unsaturated dicarboxylic acid.

The mixture of rosin acid partial esters of the polyol, formed as above described, is converted to a polymerizable monomer by reacting at least some of its hydroxyl functionality with an α,β-saturated dicarboxylic acid or anhydride for the purpose of producing a half-acid ester of the α,β-unsaturated dicarboxylic acid or anhydride with the rosin acid partial ester of the polyol. Typical of the α,β-unsaturated dicarboxylic acids or anhydrides which can be used herein are maleic, fumaric, itaconic and citraconic. The anhydrides are preferred since they react with alcohols at much lower temperatures, thus minimizing the hazard of gelation via esterification. Also, where rosin acids with conjugated double bonds are used, anhydrides minimize the Diels-Alder reaction. The preferred temperature range for this reaction is from about 110° to about 160° C. Temperatures substantially higher than 160° C., e.g., 170°–200° C., can lead to esterification reactions involving polyol functionality.

In determining the amount of α,β-unsaturated dicarboxylic acid or anhydride to use, consideration must be given to the following. The esterification of a polyol having a hydroxyl functionality n of four (4) with n/2 moles of rosin acid will produce a mixture of esters in which the diester predominates but which otherwise ranges from complete esterification to no esterification. Thus, for example, when pentaerythritol is reacted with two moles of hydrogenated rosin acid, the resulting product will not only contain the expected di-rosin acid ester but also smaller amounts of mono-, tri- and tetra-esters as well as some unesterified pentaerythritol. Moreover, the reaction of, say, the pentaerythritol—di-rosin acid ester with one mole of, e.g., maleic anhydride, gives not only pentaerythritol—di-rosin acid—maleate but also some pentaerythritol—di-rosin acid—dimaleate which is a potent cross-linking agent in a vinyl polymerization. How much of this can be tolerated depends on how long the polymer chains are (i.e., the molecular weight) and how many maleate units are in the chain (i.e., what are the relative reactivity ratios). A monomer like methyl methacrylate has much less copolymerization tendency for maleate than does styrene. It tends to give rather long segments of methacrylate while styrene tends to alternate with maleate. Thus, the concentration of the dimaleate is much more critical with styrene than with methyl methacrylate or acrylates in general.

Thus, within the above limitations, the amount of $\alpha,\beta$-unsaturated dicarboxylic acid or anhydride can vary from about 0.5 to about 2 equivalents. The preferred range of equivalents of $\alpha,\beta$-unsaturated dicarboxylic acid or anhydride is from about 0.5 to about 1.2.

It is realized, of course, that where less than stoichiometric amounts of $\alpha,\beta$-unsaturated dicarboxylic acid or anhydride are used to prepare the polymerizable rosin monomer the final product will contain some unpolymerized rosin ester. When this is not compatible with the copolymer formed, it may be separated as by filtration or precipitation techniques. However, when post-curing is used, this unreacted portion can cure to become part of the ultimate product via its own hydroxyl functionality and, hence, if desired, can be left in.

The third part of the procedure for preparing the copolymers of the invention involves copolymerization of the ester mixture with at least one polymerizable monomer containing a $>C=CH_2$ group. This can be carried out with the usual free radical-initiated polymerization procedures in bulk, solution, or latex form. Inert atmospheres are required and initiators active at the desired temperature should be used.

Polymerizable monomers containing the $>C=CH_2$ group which can be used herein are acrylic and methacrylic acids and their one to twelve carbon atoms alkyl esters, acrylonitrile, allyl acetate, allyl chloride, butadiene, styrene and its polymerizable ring-substituted derivatives, methacrylonitrile, $\alpha$-methylstyrene, $\alpha$- and $\beta$-chloroacrylic acids and their one to four carbon atoms alkyl esters, $\beta$-chloromethacrylic acid and its one to four carbon atoms alkyl esters, $\beta$-chloromethacrylic acid and its one to four carbon atoms alkyl esters, methyl vinyl ketone, vinyl acetate, vinyl benzoate, vinyl chloride, vinyl alkyl and aryl ethers, in which the alkyl groups have 1 to 12 carbon atoms, vinyl pyridine, vinylidene chloride, maleic anhydride, maleate esters, e.g., ethyl maleate, and fumaric esters, e.g., ethyl fumarate. Any of these monomers can be used either alone or in various mixtures with each other. The amount of vinyl monomer or mixture of vinyl monomers can vary from about 10% to about 90% by weight, based on the combined weight of vinyl monomer and $\alpha,\beta$-unsaturated dicarboxylic acid or anhydride half-ester of a rosin acid partial ester of a polyol.

Any of the free radical initiators which are commonly used in the art for polymerizations of the type here involved can be used herein. Typical of these are benzoyl peroxide, azobisisobutyronitrile, cumene hydroperoxide, t-butyl perbenzoate, cyclohexanone peroxide, etc. The preferred organic peroxides are those which are characterized by having a half-life of between about 0.1 hour and about 2.0 hours at temperatures in the range of about 125° to about 160° C. and by being nonvolatile at temperatures in said range. The half-life of the peroxide is a measure of its rate of decomposition in a dilute solution in an inert solvent at a given temperature, and the half-life values of a particular peroxide will vary depending upon the temperature. At temperatures in the range of about 140° to about 160° C., the preferred useful peroxides will ordinarily have half-lives of about 5 to about 60 minutes, and half-lives of about 15 to about 30 minutes at the desired reaction temperature will usually be satisfactory for addition of the vinyl monomer in accordance with this invention.

Exemplary of the preferred peroxides are dicumyl peroxide, di-t-butyl peroxide, (bis($\alpha,\alpha$-dimethylbenzyl peroxide)), m-bis(t-butylperoxyisopropyl)benzene, p-bis(t-butylperoxyisopropyl)benzene, t - butylperoxyisopropyl carbonate and 2,5 - dimethyl-2,5-di(t-butylperoxy)hexane. The amount of organic peroxide used in accordance with the invention is from about 0.5% to about 10% by weight based on the amount of vinyl monomer utilized.

The preferable amount on this basis is from about 1% to about 3% by weight. The comparatively large amounts of peroxide used in accordance with this invention provide relatively short chains of copolymers which give them better compatibility characteristics.

The hydroxyl functionality of the rosin monomer can also be a complicating factor in polymerizations with some monomer mixtures such as those utilized in Examples 6, 7 and 8. This is because a monomer like maleic anhydride can react with hydroxyls at temperatures well below 150° C. to cause premature gelation. In such cases it may be necessary and/or desirable to block the hydroxyl functionality of the rosin monomer by reacting it with a non-polymerizable anhydride, e.g., a carbocyclic dicarboxylic anhydride such as phthalic anhydride, tetrahydrophthalic anhydride, hexahydrophthalic anhydride, tetrachlorophthalic anhydride and chlorendic anhydride (the Diels-Alder adduct of hexachlorocyclopentadiene and maleic anhydride). The carbocyclic anhydride can be added to the rosin acid partial ester of the polyhydric alcohol component either in admixture with the $\alpha,\beta$-unsaturated dicarboxylic acid or anhydride or separately. The amount to be added should be sufficient to react with any hydroxyl functionality of the polyol which has not reacted, or will not react, with the rosin acid and the $\alpha,\beta$-unsaturated dicarboxylic acid.

The polymerization reaction is continued until the solution viscosity is constant. Upon completion of the polymerization reaction, the product can be recovered in any suitable manner as by precipitation from solvents, as in Example 8, or it may be used as such, i.e., in solution.

Many of the copolymers prepared as herein described are satisfactory in various applications without additional treatment. However, surprisingly, it is possible, utilizing the process of the invention, to prepare rosin-containing copolymers with a wide range of properties and which have the needed functionality for thermosetting with reactive resins such as the aminoformaldehyde types, epoxies and isocyanates. Moreover, other functionality can be included in the polymers by selecting comonomers such as acrylic acid or glycidol methacrylate. The examples also show that terpolymers can be made with the rosin ester monomer and appropriate polymerizable monomer mixtures such as styrene and maleic anhydride. The resulting anhydride-substituted products may, of course, be cured with the appropriate resins and may also be modified to provide rosin-containing polymers soluble even in (1) alcohol and (2) water. Thus, alcohol solubility can be gained by alcoholyzing with alcohols, glycols and the like, and water solubility can result via opening the anhydride rings with ammonia or amines. These products can be used as such or, in turn, cured to cross-linked systems.

It will thus be seen that the present invention provides rosin-containing copolymers having a wide variety of properties including compatibility with materials such as nitrocellulose, poly(vinyl chloride), chlorinated rubber, urea-formaldehyde and melamine-formaldehyde products, and cellulose acetate butyrate. These products are useful in printing inks, can coatings, floor polishes, lacquer coatings, varnishes, enamels, adhesives and protective coatings in general. They are also useful in cross-linking agents.

What I claim and desire to protect by Letters Patent is:
1. A copolymer comprising the product from the polymerization of
(a) an ester mixture having the average formula

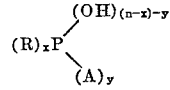

where P is the residue of a polyol of hydroxyl functionality $n$, esterified with $x$ equivalents of rosin acid R and $y$ equivalents of a material A selected from the group consisting of α,β-unsaturated dicarboxylic acids and their anhydrides, $n$ being at least 2, $x$ being at least 0.5 and not greater than $(n-0.5)$; $y$ being at least 0.5 and not greater than 2.0, and $(n-x)-y$ ranging from 0 to about 2.5; and (b) at least one polymerizable monomer containing the $>C=CH_2$ group, the amount of polymerizable monomer (b) being from 10% to 90% by weight, based on the total weight of (a) and (b).

2. The process of preparing a copolymer which comprises polymerizing (a) an ester derived by
   (1) heating a polyol with a rosin acid at temperatures from about 190° C. to about 250° C. whereby there is formed a mixture of rosin acid partial esters of the polyol
   (2) reacting, at a temperature of from about 110° C. to about 160° C., the mixture of rosin partial esters with a material selected from the group consisting of α,β-unsaturated dicarboxylic acids and their anhydrides to form an ester mixture having the average formula

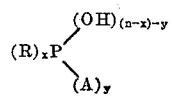

where P is the residue of a polyol of hydroxyl functionality $n$, esterified with $x$ equivalents of rosin acid R and $y$ equivalents of a material A selected from the group consisting of α,β-unsaturated dicarboxylic acids and their anhydrides, $n$ being at least 2, $x$ being at least 0.5 and not greater than $(n-0.5)$, $y$ being at least 0.5 and not greater than 2.0, and $(n-x)-y$ ranging from 0 to about 2.5, and (b) at least one polymerizable monomer having a $>C=CH_2$ group, the amount of polymerizable monomer (b) being from about 10% to about 90% by weight, based on the total weight of (a) and (b).

3. The process of claim 2 wherein the polyol is selected from the group consisting of polyols having a hydroxyl functionality of at least three (3) and mixtures of polyols having an average hydroxyl functionality of at least three (3).

4. The process of claim 2 wherein the polyol is pentaerythritol.

5. The process of claim 2 wherein the compound selected from the group consisting of α,β-unsaturated acids and anhydrides is maleic anhydride.

6. The process of claim 2 wherein the polymerizable monomer containing the $>C=CH_2$ group is styrene.

7. The process of claim 2 wherein the polymerizable monomer containing the $>C=CH_2$ group is methyl methacrylate.

8. The process of claim 2 wherein the polymerizable monomer containing the $>C=CH_2$ group is butyl acrylate.

9. The process of claim 2 wherein the polymerizable monomer containing the $>C=CH_2$ group is butyl methacrylate.

10. The process of claim 2 wherein the polymerizable monomer containing the $>C=CH_2$ group is a mixture of styrene and maleic anhydride and wherein a carbocyclic anhydride is included in the reaction, the amount of said carbocyclic anhydride taken wtih said rosin acid and said compound selected from the group consisting of α,β-unsaturated dicarboxylic acids and anhydrides being such as to provide the total carboxyl equivalents needed for reaction with the total hydroxyl equivalents supplied by the polyol.

11. The process of claim 2 in which the rosin acid is abietic acid.

12. The process of claim 2 in which the rosin acid is dehydroabietic acid.

13. The process of claim 2 in which the rosin acid is hydrogenated abietic acid.

14. The process of claim 2 in which the rosin acid is rosin.

15. The process of claim 2 in which the rosin acid is hydrogenated rosin.

16. The process of claim 2 in which the rosin acid is dehydrogenated rosin.

References Cited

UNITED STATES PATENTS 2,447,367  8/1948  Rust et al. _____ 260—27

JOSEPH L. SCHOFER, *Primary Examiner.*

J. KIGHT, *Assistant Examiner.*